(12) United States Patent
Rimmer

(10) Patent No.: US 8,949,389 B1
(45) Date of Patent: Feb. 3, 2015

(54) METHOD AND SYSTEM FOR CONFIGURING VIRTUAL FABRICS

(75) Inventor: Todd Rimmer, Exton, PA (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 12/059,265

(22) Filed: Mar. 31, 2008

(51) Int. Cl.
*G06F 15/177* (2006.01)
*H04L 12/24* (2006.01)

(52) U.S. Cl.
CPC ........... *H04L 41/0866* (2013.01); *H04L 41/082* (2013.01)
USPC ........... 709/222; 709/220; 709/226; 370/230; 370/230.1; 370/235

(58) Field of Classification Search
USPC .................................................. 709/220–222
See application file for complete search history.

(56) References Cited

U.S. PATENT DOCUMENTS

| | | | |
|---|---|---|---|
| 6,920,491 B2* | 7/2005 | Kim .............................. | 709/220 |
| 2004/0215848 A1* | 10/2004 | Craddock et al. ............... | 710/39 |
| 2007/0268903 A1* | 11/2007 | Nakagawa .................... | 370/392 |

* cited by examiner

*Primary Examiner* — Jackie Zuniga Abad
(74) *Attorney, Agent, or Firm* — Blakely, Sokoloff, Taylor & Zafman LLP

(57) ABSTRACT

A method and system for configuring an Infiniband fabric is provided. The method comprises providing a virtual fabric configuration parameter via an enhanced user interface to a subnet manager ("SM") to configure a virtual fabric within the Infiniband fabric; analyzing the virtual fabric; determining if configuration based on the virtual fabric configuration parameter can be implemented; computing a quality of service (QOS) parameter, a routing and a partition such that the QOS parameter, routing and partitioning are interrelated; and configuring a plurality of switches and a plurality of host channel adapters (HCA's) within the virtual fabric.

23 Claims, 6 Drawing Sheets

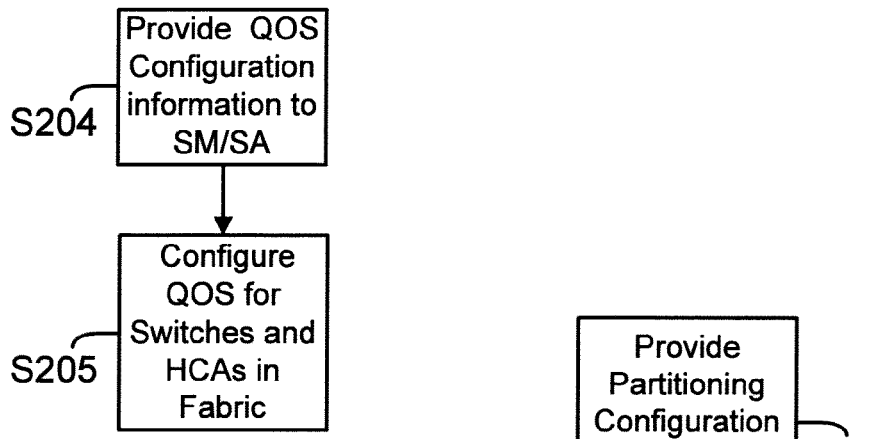
FIG. 2B
Prior Art
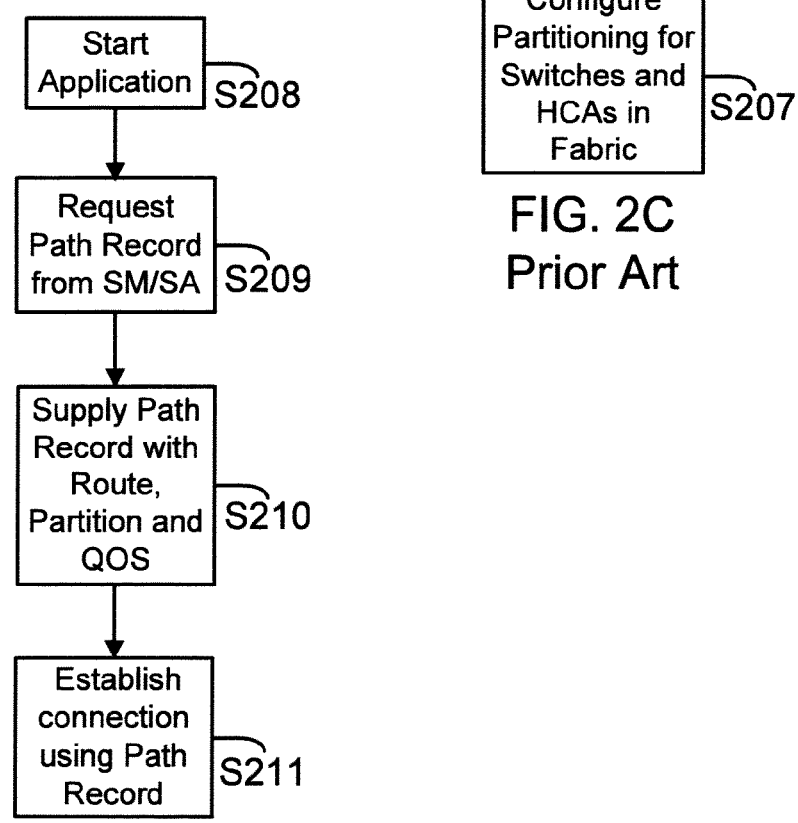
FIG. 2C
Prior Art
FIG. 2D
Prior Art

METHOD AND SYSTEM FOR CONFIGURING VIRTUAL FABRICS

BACKGROUND

1. Technical Field

The present disclosure relates to network systems.

2. Related Art

Network systems are commonly used to move network information (may also be referred to interchangeably, as frames, packets or commands) between computing systems (for example, servers) or between computing systems and network devices (for example, storage systems). Various industry standards, hardware and software components are used to implement network communication, including network switches.

Infiniband ("IB") is one such industry standard used with computing systems and input/output (I/O) devices. IB is used to create fabrics that are complex networks, which may encompass hundreds and even thousands of interconnected hosts/switches/servers, all working in parallel to solve complex problems.

Configuring virtual fabrics is a challenge. Typically, when a user configures a virtual fabric, the user provides configuration parameters for partitions, Quality of Service (QOS) and routing. QOS is used to configure service levels for a network link. Partitions are created so that only authorized systems/devices within a fabric are allowed to communicate with each other. Routing configuration is used to route packets between two nodes, based on a routing table. These configuration parameters are provided separately to a subnet manager.

QOS configuration, partition and routing configuration all occur independently of each other. The subnet manager (SM) analyzes the fabric topology and computes uniform routing for the paths, uniform partitions for the servers and uniform QOS for links between nodes. This uniformity may result in routes that are not desirable by the user. Continuous efforts are being made to improve virtual fabric configuration.

SUMMARY

A method for configuring an Infiniband fabric is provided. The method comprises providing a virtual fabric configuration parameter via an enhanced user interface to a subnet manager ("SM") to configure a virtual fabric within the Infiniband fabric; analyzing the virtual fabric; determining if configuration based on the virtual fabric configuration parameter can be implemented; computing a quality of service (QOS) parameter, a routing and a partition such that the QOS parameter, routing and partitioning are interrelated; and configuring a plurality of switches and a plurality of host channel adapters (HCA's) within the virtual fabric.

A system for configuring an Infiniband fabric is provided. The system comprises an enhanced subnet manager (SM) user interface coupled to an enhanced subnet manager, wherein a user inputs a configuration request to configure a virtual fabric to the enhanced subnet manager; and the enhanced subnet manager (a) validates if the configuration request is realizable; (b) computes Quality of service, routing and partitioning in an interrelated manner; and (c) configures a plurality of switches and a plurality of HCA's in the virtual fabric.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIGS. 2A-2D shows conventional process flow diagrams for configuring IB fabrics;

DETAILED DESCRIPTION

Definitions

Figure 1A:
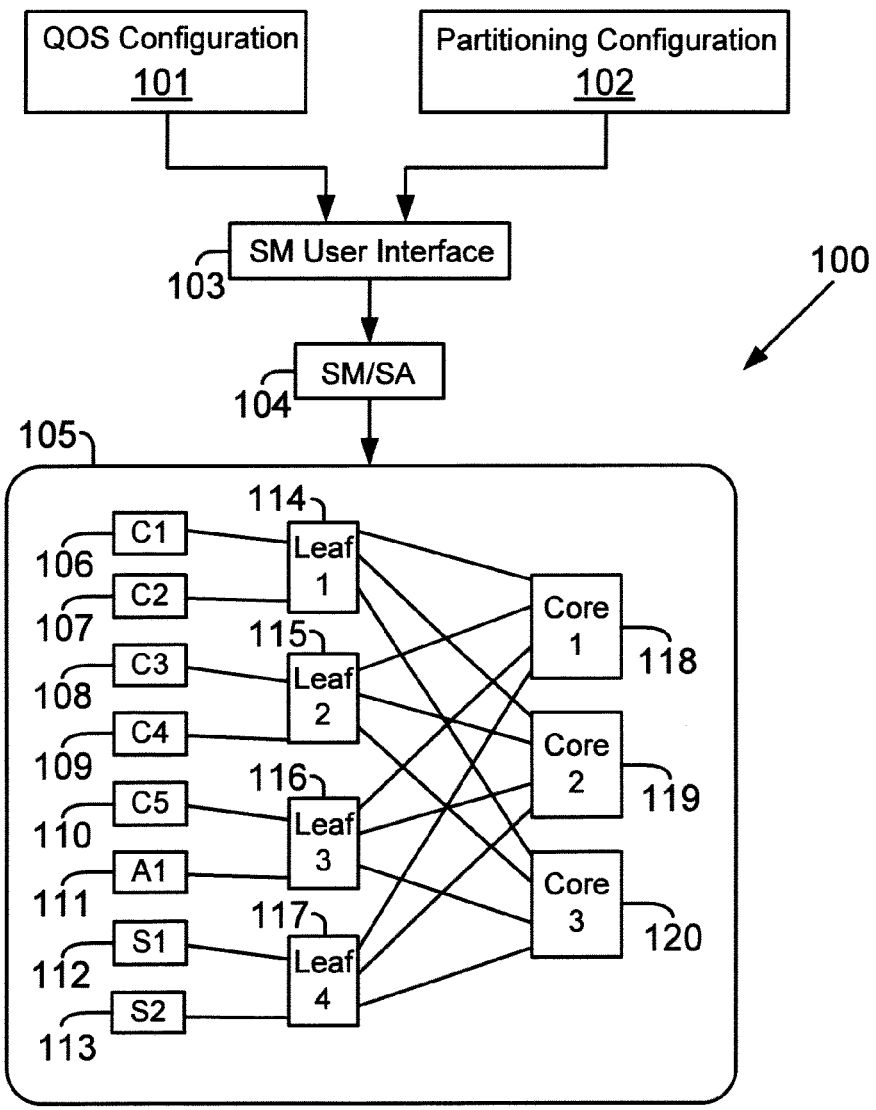
FIG. 1A shows an Infiniband network used according to one embodiment.

The following definitions are provided for convenience as they are typically (but not exclusively) used in InfiniBand (IB) and general networking environment, implementing the various adaptive aspects described herein.

"Application Server": A computing system executing an application for reading and writing data to a storage system or for performing any other function.

"Computer Server or Compute Node": A computing system coupled to a network.

"Channel Adapter": A device that terminates a link and executes transport level functions. A host channel adapter is coupled to a host system and a target channel adapter is coupled to a target.

"Core Switch": Typically, a switch is used at the center of an IB fabric. Core switches are the furthest from the computing nodes.

"DLID": Destination local identifier is a field in an IB packet identifying a local subnet packet destination.

"Fabric": A collection of links, switches, routers that connect to a host channel adapter or a target channel adapter.

"Leaf Switch": A switch at the edge of an IB fabric. Leaf Switches are the closest to the Compute Nodes.

"LID" (Local Identifier): An address assigned by a subnet manager, unique within the subnet, used for directing packets within the subnet.

"LMC" (LID Mask Control): A per-port value assigned by the subnet manager. The value of the LMC specifies the number of Path Bits in the Local Identifier.

"Packet": A group of one or more network data word(s) used for network communication. For example, IB uses IB packets for network communication. A frame may be considered a packet.

"Partition": A collection of channel adapter ports that are allowed to communicate with one another. Ports may be members of multiple partitions simultaneously. Ports in different partitions are unaware of each other's presence.

"Partition key": A value carried in IB packets and stored in channel adapters that is used to determine/validate membership within a partition.

"Partition Table": A table of partition keys stored in each port.

"Path": The collection of links, switches and routers that a message traverses from a source port to a destination port. Within a subnet, an SLID, DLID and SL define a path.

"Path Record": A Response provided by the SM/SA which includes the addressing information to uniquely define a path.

"Port": Location on a channel adapter or a switch to which a link is connected. There may be multiple ports on a single channel adapter and switches.

"QOS": Quality of Service, metrics that predict the behavior, reliability, speed and latency of a network connection.

"Routing Table": A table in a switch that stores information for routing a packet based on addressing information (DLID) in the packet.

"ServiceID": A value that allows a communication manager to associate an incoming connection request with the entity providing the service.

"Service Level (SL)": A value in an IB local routing header identifying a virtual lane for a packet. According to the IB standard, while the appropriate VL for a specific SL may differ, the SL remains constant.

"SLID": An address assigned to a source port by a subnet manager.

"SL to VL table": A table that maps SL to VL.

"Subnet Manager": An entity used for configuring a subnet, where the subnet is a set of IB ports and associated links that have a common subnet identifier (ID). Subnets themselves may be coupled to each other by routers.

"Storage server": A computing device that manages requests for accessing data in storage systems.

"VL arbitration table": A Table within each port (switch, HCA and TCA) which is configured by the subnet manager. This table defines the minimum bandwidth and hence QOS which will be available to each Virtual Lane (VL) of a port.

"Switch": A device that facilities network communication conforming to IB and other switch standards/protocols.

"Virtual Lane" (VL): The term VL as defined by Section 3.5.7 of the IB Specification provides a mechanism for creating virtual lanes within a single physical link. A virtual lane represents a set of transmit and receive buffers in a port. A data VL is used to send IB packets and according to the IB Specification, configured by a subnet manager based on a Service Level field in a packet.

In one embodiment, a consolidated configuration system and process is provided for efficiently configuring and managing a subnet. The process evaluates a plurality of parameters, as described below, for configuring and managing a subnet.

To facilitate an understanding of the various embodiments, the general architecture and operation of an IB based network system is described. The specific architecture and operation of the preferred embodiment will then be described with reference to the general architecture.

As an example, the various embodiments herein are described with respect to the IB operating environment. IB is a switched fabric interconnect standard for servers and is typically deployed for server clusters/enterprise data centers ranging from two to thousands of nodes.

It is noteworthy that the disclosed embodiments are not limited to the IB environment. The adaptive aspects disclosed herein are applicable to other network protocols and standards, for example, the Fibre Channel over Ethernet (FCOE) standard and others.

Network System:

FIG. 1A shows a block diagram of an IB based network system 100. Network system 100 includes a fabric 105 that is configured by using Subnet manager/subnet administrator (SM/SA) (jointly referred to as SM) 104. In one embodiment, SM 104 may be implemented as a software application executed by a computing device. SM 104 provides a user interface 103 that allows a user to configure fabric 105 devices. In one embodiment, user interface 103 may be a command line interface (CLI) or a Graphical User Interface ("GUI").

In a conventional system, a user inputs separate QOS and partitioning information (101 and 102). QOS and partitions are set up independent of each other, which is undesirable, as described below.

Fabric 105 includes plural computing nodes C1 106, C2 107, C3 108, C4 109 and C5 110, administration node A1 111, storage nodes S1 112 and S2 113, plural leaf switches leaf1 114, leaf2 115, leaf3 116, leaf4 117 and plural core switches core1 118, core2 119 and core3 120.

Computing nodes 106-113 may include computing systems with several functional components. These components may include a central processing unit (CPU), main memory, input/output ("I/O") devices, and streaming storage devices (for example, tape drives). For a computing node, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system (or computing node) with the CPU and main memory is often referred to as a host system.

Figure 1B:
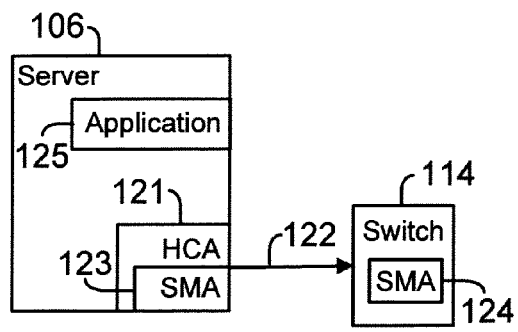
FIG. 1B shows a block diagram of an Infiniband (IB) server coupled to a switch.

Computing Node:

FIG. 1B shows an example of a computing node 106 (for example, an IB server) that is operationally coupled to a switch 114 via a link 122. Computing node 106 includes a host channel adapter (HCA) 121 that is coupled to switch 114 via link 122. HCA 121 interfaces with a server processor (not shown) to send and receive information via switch 114. Server 106 executes one or more applications 125 to communicate with other servers via link 122.

As defined by the IB standard version 1.2, HCA 121 may include a Subnet Management Agent (SMA) 123. SMA 123 implements an SMA protocol, which is used by SM/SA 104 (FIG. 1A) to configure the QOS and partitioning attributes for HCA 121.

Figure 1C:
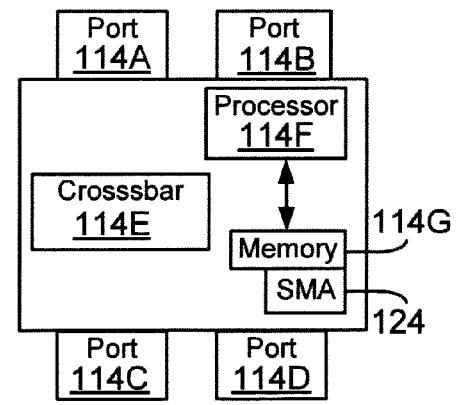
FIG. 1C shows a block diagram of an IB switch with a subnet management agent ("SMA")

Switch:

FIG. 1C shows an example of a switch 114 used according to one embodiment of the present disclosure. Switch 114 may be an IB switch. Switch 114 includes a plurality of ports, shown as 114A-114D and a crossbar 114E. Ports 114A-114D may be coupled to other devices (including switches, servers and others) using links (for example, 122).

Switch 114 includes a processor module 114F that executes firmware out of memory 114G to control overall switch 114 operations. Switch 114 also include SMA 124 as defined by the IB standard. SMA 124 implements the SMA protocol, which is used by the SM/SA 104 to configure switch routing, QOS and partitioning attributes.

Figure 2A:
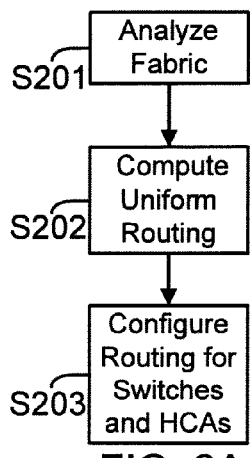

Conventional Process Flow:

FIG. 2A shows a flow diagram of a conventional process for configuring fabric 105. In step S201, SM/SA 104 analyzes the overall topology of fabric 105.

In step S202, SM/SA 104 computes uniform routing for fabric 105. Such routing uniformly distributes routes across all available paths through fabric 105. An example of uniform routing is described below.

In step S203, SM/SA 104 configures the computed routing for switches 114 through 120 and HCAs 121 via SMAs 123 and 124, respectively.

The uniform routing is configured independently and partition and QOS information is not typically considered. A uniform route may also not be the most desirable route for efficiently routing packets.

Example for Uniform Routing:

The following provides an example of conventional uniform routing. In fabric 105, leaf switches 114, 115, 116 and 117 may be configured to route packets via core switches 118, 119 and 120 as follows.

| Destination | Route |
|---|---|
| C1 106 | Route via Core1 118 |
| C2 107 | Route via Core2 119 |
| C3 108 | Route via Core3 120 |
| C4 109 | Route via Core1 118 |
| C5 110 | Route via Core2 119 |
| A1 111 | Route via Core3 120 |
| S1 112 | Route via Core1 118 |
| S2 113 | Route via Core2 119 |

The exceptions from the above routes would be cases where a direct route is available without involving a core switch, for example leaf1 114 may route packets directly to C1 106 and C2 107 without using a core switch, for example 118. Similarly, leaf2 115 may route packets directly to C3 108 and C4 109; leaf 3 116 may route packets directly to C5 110 and A1 111; and leaf4 117 may route packets directly to S1 112 and S2 113.

In Fabric 105, there is only one route possible from each core switch 118, 119, 120 to servers 106, 107, 108, 109, 110, 111, 112 and 113. Hence, each core switch is configured as follows:

| Destination | Route |
|---|---|
| C1 106 | Route via leaf1 114 |
| C2 107 | Route via leaf1 114 |
| C3 108 | Route via leaf2 115 |
| C4 109 | Route via leaf2 115 |
| C5 110 | Route via leaf3 116 |
| A1 111 | Route via leaf3 116 |
| S1 112 | Route via leaf4 117 |
| S2 113 | Route via leaf4 117 |

Conventional systems support an Infiniband standard feature called LMC (LID Mask Control), based on which multiple LIDs may be configured for an HCA 121. In conventional systems, the SM/SA 104 using LMC, uniformly configure HCAs 121 to have the same number of LIDs. Uniform routing is configured for all the LIDs provided. For example, in fabric 105, if LMC is configured to provide 2 LIDs per HCA 121, the SM/SA 104 may uniformly configure the following additional routes. Leaf switches 114, 115, 116 and 117 are configured similarly to route via core switches 118, 119 and 120 as follows.

| Destination | Route |
|---|---|
| C1 106 | Route via Core2 119 |
| C2 107 | Route via Core3 120 |
| C3 108 | Route via Core1 118 |
| C4 109 | Route via Core2 119 |
| C5 110 | Route via Core3 120 |
| A1 111 | Route via Core1 118 |
| S1 112 | Route via Core2 119 |
| S2 113 | Route via Core3 120 |

The exceptions listed above and the routes for the core switches listed above would also apply to the additional LIDs.

Conventional QOS Configuration:

FIG. 2B shows a process flow diagram of a conventional process for establishing QOS in Infiniband fabrics. The process starts in step S204, when a user provides SM/SA 104 with a desired QOS configuration (for example configuration 101, FIG. 1A referred to herein as C101). An example of the desired configuration, C101 is described below.

QOS Configuration C101 (Items 1-21):
  1 Application
  2 ServiceID=1234
  3 Service Level=1
  4 Application
  5 ServiceID=5678
  6 Service Level=2
  7 Application
  8 ServiceID=1567
  9 Service Level=3
  10 Service Level 1
  11 Virtual Lane=1
  12 Service Level 2
  13 Virtual Lane=2
  14 Service Level 3
  15 Virtual Lane=3
  16 QOS Scheduling Table
  17 High Priority
  18 VL 3 Count 1
  19 Low Priority
  20 VL 1 Count 3
  21 VL 2 Count 1

In C101, items 1-9 map a plurality of applications 125, as identified by a Service identifier (Service ID) to specific Service Levels. Items 10 through 15 map Service Levels to Virtual Lanes (per the IB standard). The mapping may be implemented as a SL to VL table. The tables are programmed identically in each HCA 121 and switches 114 through 120 using SMA 123 and SMA 124. Infiniband specification version 1.2 describes the SL to VL tables within the Subnet Management Agent (SMA) 123 and 124.

Items 16-21 define the Virtual Lane priorities and arbitration tables. This is used to generate the VL Arbitration tables, which are programmed in each HCA 121 and switches 114 via SMA 123 and 124. Infiniband specification version 1.2 describes VL Arbitration tables in detail.

In step S205, based on user input in step S204, SM/SA 104 configures the QOS settings for the switches and HCAs in fabric 105.

Conventional Partitioning Configuration:

FIG. 2C shows a process flow diagram for conventional partitioning of IB fabrics.

The process starts in step S206 when a user provides partitioning configuration information (for example, 102 (also referred to as C102), FIG. 1A) to SM/SA 104 via SM user interface 103. An example of C102 is provided below.

Example of Partitioning Configuration C102 (Items 1 to 6):
1 Partition 0x0001
2 Servers=C1,C2,C3
3 Partition 0x0002
4 Servers=C4,C5
5 Partition 0x0003
6 Servers=C1, C2,C3,C4,C5, A1,S1,S2

In C102 described above, Items 1 and 2 define a partition, identified by a partition key 0x0001. This partition consists of servers C1 106, C2 107 and C3 108. SM/SA 104 configures a partition table (not shown) with partition key 0x0001 in HCA 121 for servers C1 106, C2 107 and C3 108. This makes the servers members of partition 0x0001. Infiniband specification version 1.2 defines Partition keys and Partition Tables within the Subnet Management Agent (SMA) 123. Additional Partitions are defined in Items 3, 4, 5 and 6 which result in similar configuration using Partition Keys and Partition Tables.

In step S207, SM/SA 104 configures the partitioning information for switches 114 to 120 and HCAs 121.

FIG. 2D shows a flow diagram for establishing a connection in conventional systems. The process starts in step S208, when application 125 is initialized.

In step S209, application 125 requests a Path Record from the SM/SA 104. As part of the request, application 125 provides an application identifier (ServiceID) and a Partition key to SM/SA 104.

In step S210, SM/SA 104 responds to application 125 with a complete Path Record. The Path Record is defined by the Infiniband specification version 1.2. A Path Record includes routing information (example Source LID and Destination LID), partitioning information (for example, a Partition key) and QOS information (for example, Service Level). Application 125 uses the Path Record for routing packets.

At step S211, application 125 establishes a connection using the Path Record supplied in step S210.

As described above with respect to configuration information C101 and C102, SM/SA 104 is unaware of any desired relationships between application 125, partitioning and routing. Configuration values provided by the user are independently computed via process steps S203, S205 and S207. The embodiments described herein solve the shortcomings of conventional systems, as described below.

Figure 3:
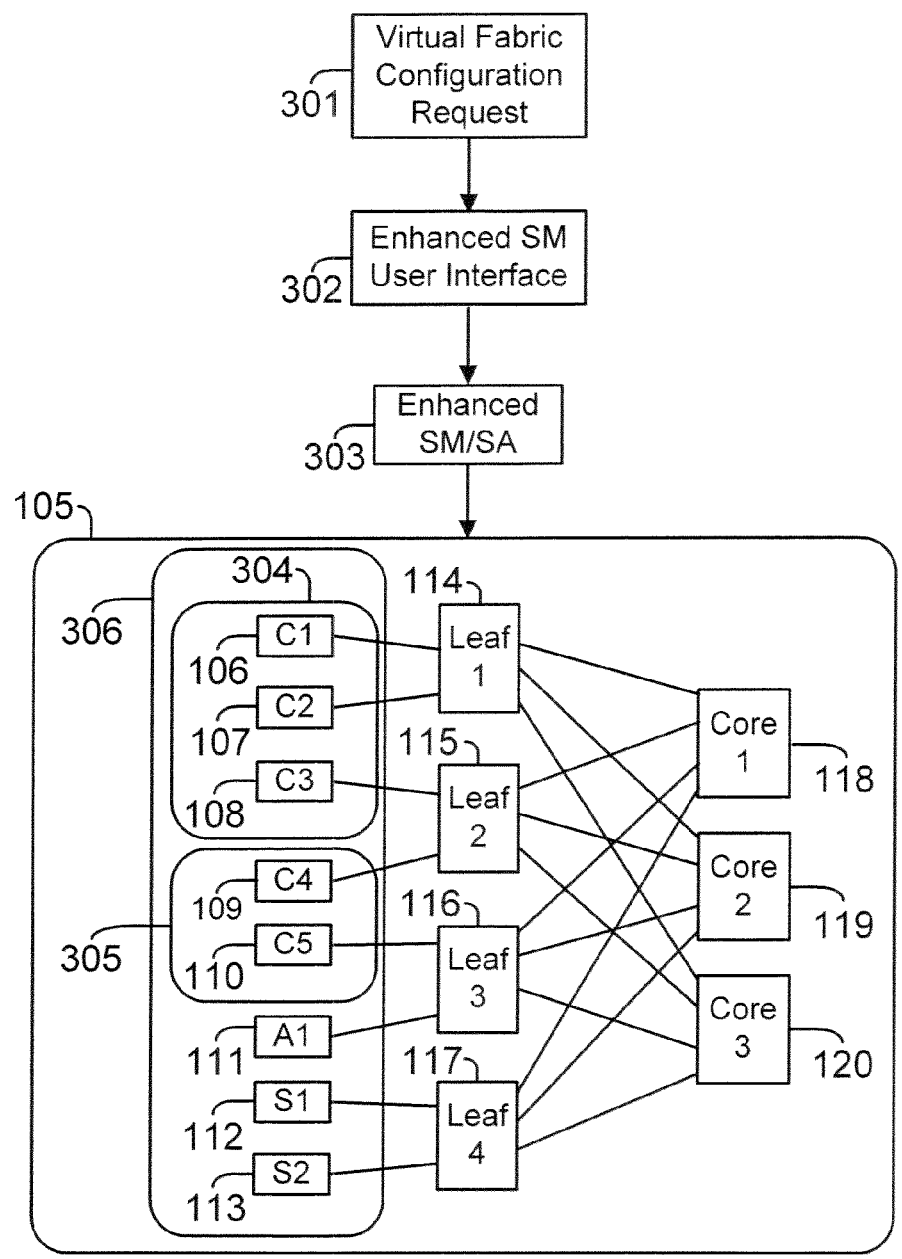
FIG. 3 shows a system diagram with an enhanced subnet manager, according to one embodiment of the present disclosure.

Enhanced User Interface/System:

FIG. 3 shows a system diagram with an enhanced subnet manager SM/SA 303 interfacing with an enhanced SM user interface 302 for configuring fabric 105, according to an embodiment of the present disclosure. Various Fabric 105 components have been described above. In FIG. 3, fabric 105 includes three virtual fabrics 304, 305 and 306 and their configuration is described below.

Virtual fabric 304 includes servers 106 through 108, virtual fabric 305 includes servers 109 and 110 and virtual fabric 306 includes servers 106-113. According to one embodiment, SM/SA 303 analyzes fabric 105 and assigns routes and switches for each Virtual fabric. For example, SM/SA 303 assigns switch 118 to virtual fabric 304, switch 119 to virtual fabric 305 and switch 120 to virtual fabric 306.

To configure the virtual fabrics, a user sends consolidated virtual fabric configuration information request 301 (also referred to as C301) to SM/SA 303 via the enhanced user interface 302. Configuration information 301 includes QOS and partitioning information. An example of combined QOS and partitioning information 301 is provided below (Items 1 to 26):
1 Virtual fabric 304
2 Name=Compute1
3 Servers=C1, C2, C3
4 Bandwidth=15 Gb
5 Application MPI
6 ServiceID=1234
7 Priority=Low
8 Virtual fabric 305
9 Name=Compute2
10 Servers=C4, C5
11 Bandwidth=15 Gb
12 Application MPI
13 ServiceID=1234
14 Priority=Low
15 Virtual fabric 306
16 Name=All
17 Servers=C1,C2,C3,C4,C5,A1,S1,S2
18 Bandwidth=5 Gb
19 Application Admin
20 ServiceID=5678
21 Priority=High
22 Bandwidth=1 Gb
23 Application Storage
24 ServiceID=1567
25 Priority=Low
26 Bandwidth=4 Gb Items 1 through 7 shown above define virtual fabric 304 within fabric 105. Item 3 lists the servers C1 106, C2 107, C3 108 as being part of virtual fabric 304. The server list is used to define partitioning for fabric 105 as described below with respect to FIG. 5.

Item 4 defines the bandwidth used by virtual fabric 304. The bandwidth may be used to compute routing for virtual fabric 304 as described below with respect to FIG. 5.

Items 5 through 7 list applications 125 that are run within the Virtual fabric 304. The list of applications may be used for QOS configuration.

Items 8 to 14 deal with virtual fabric 305 configuration parameters, while Items 15-26 involve virtual fabric 306 configuration parameters.

Figures 4A, 4B:
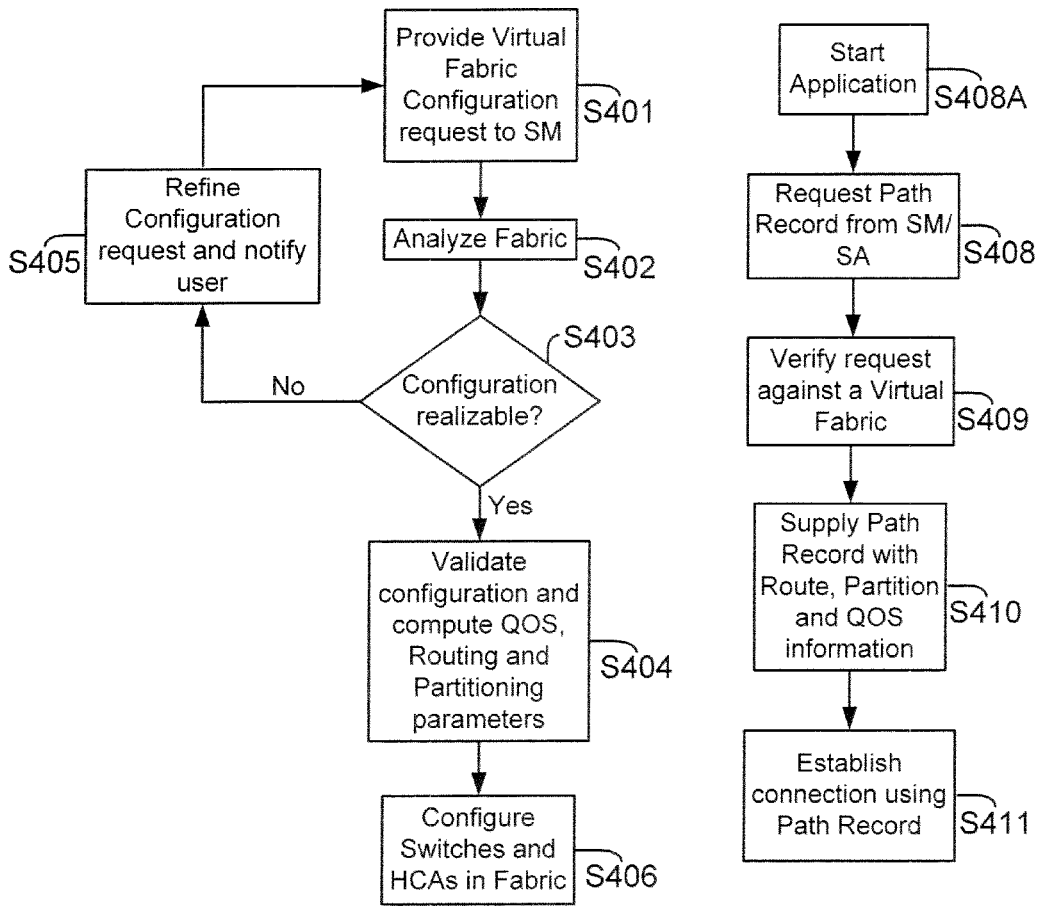
FIG. 4A shows a process flow diagram for configuring an IB fabric, according to one embodiment of the present disclosure.
FIG. 4B shows another process flow diagram for application startup and connection establishment, according to one embodiment of the present disclosure.

FIG. 4A shows a process flow diagram for configuring an Infiniband fabric, according to one embodiment. The process starts in step S401, when a user provides a desired configuration (for example, C301, described above) to enhanced SM/SA 303. The desired configuration includes information regarding plural virtual fabrics (for example, 304, 305 and 306, FIG. 3); bandwidth (i.e. a rate at which data can be transferred or should be transferred), a priority scheme and application(s) identifiers 125, as described above.

In step S402, SM/SA 303 analyzes the overall topology of fabric 105, QOS and partitioning capabilities of each HCA 121 and switches 114 through 120.

In step S403, SM/SA 303 determines if the user requested configuration is possible, based on system and hardware constraints. If the configuration cannot be implemented, then in step S405, SM/SA 303 refines the user requested configuration and notifies the user. For example, if the user requests a bandwidth of 15 Gbs (Giga bits per second) and the hardware is only capable of operating at 1 Gbs, then SM/SA 303 denies the request; changes the bandwidth to 1 Gbs and notifies the user. The process then reverts back to step S401.

If the configuration can be implemented (as determined in step S403), then in step S404, SM/SA 303 computes QOS, partitioning and routing information for fabric 105. According to one embodiment, unlike conventional systems, QOS, partitioning and routing information for fabric 105 are computed in an interrelated manner. The routing may not be uniform but is influenced by the bandwidth and membership of each virtual fabric such that virtual fabrics requesting higher bandwidth may be given more of the paths within fabric 105. Similarly, QOS settings within links 122 shared among virtual fabrics may be based on the bandwidth and priority designated for each virtual fabric. Furthermore, the membership in each partition may be based on the membership of a server and switch within a virtual fabric.

In step S406, SM/SA 303 configures switches 114 through 120 and HCAs 121 with the QOS, partitioning and routing information computed in step S404. Step S404 is described below in detail with respect to FIG. 5.

FIG. 4B shows a process flow diagram for connection establishment, according to an embodiment of the present disclosure. The process starts in step S408A when application 125 is initialized.

In step S408, application 125 requests a Path Record from SM/SA 303. As part of this request application 125 provides an application ID (Service ID) to SM/SA 303. Application 125 may also supply a Partition key to SM/SA 303.

In step S409, SM/SA 303 verifies the request with respect to a virtual fabric configuration, described above. The verification depends on the server (for example, 106 through 113) that is making the request and the Service ID provided with the request. If the application 125 supplies a partition key, then the partition key is also validated against the ServiceID to determine if the requesting server is authorized to communicate.

In step S410, SM/SA 303 responds to application 125 with a path record. The path record includes routing information (for example, Source and Destination LID), partitioning information (for example, partition key) and QOS information (for example, a Service Level). The routing, partitioning and QOS details are based on configuration C301, and the computations from step S404.

In step S411, application 125 establishes a connection using the Path Record supplied in step S410.

Figure 5:
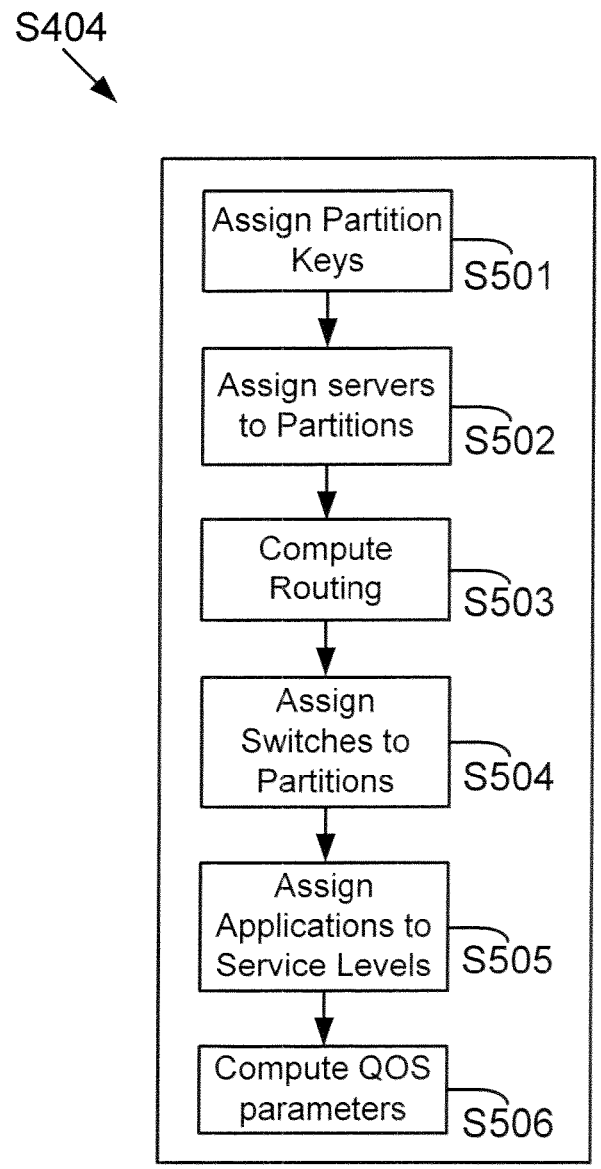
FIG. 5 shows a flow diagram for computing QOS, routing and partitioning information, according to one embodiment of the present disclosure.

FIG. 5 shows a process flow diagram for computing QOS, routing and partitioning information (step S404, FIG. 4A), according to one embodiment of the present disclosure. Turning in detail to FIG. 5, in step S501, SM/SA 303 assigns a unique partition key for each Virtual fabric 304, 305 and 306.

Using the example configuration of C301, described above, SM/SA 303 may assign unique Partition keys for each Virtual fabric as follows:
Virtual fabric Compute1 304=Partition key 0x0001
Virtual fabric Compute2 305=Partition key 0x0002
Virtual fabric All 306=Partition key 0x0003

In step S502, SM/SA 303 assigns servers 106 through 113 to the various partitions. For example, SM/SA 303 may assign the servers as follows:
C1 106 Partitions: 0x0001, 0x0003
C2 107 Partitions: 0x0001, 0x0003
C3 108 Partitions: 0x0001, 0x0003
C4 109 Partitions: 0x0002, 0x0003
C5 110 Partitions: 0x0002, 0x0003
A1 111 Partitions: 0x0003
S1 112 Partitions: 0x0003
S2 113 Partitions: 0x0003

In step S503, SM/SA 303 computes routing based on the bandwidth requirements for each virtual fabric 304 specified in configuration C301. In one embodiment, SM/SA 303 may use LMC (LID Mask control, as defined by the IB specification) to assign more than one LID (local identifier, as defined by the IB specification)) per HCA 121 such that different Virtual fabrics may have independent routes. Unlike the state of the art, the routing does not have to be uniform. For example, in configuration C301, servers 106 through 108 are a part of Virtual fabrics 304 and 306 and hence are assigned 2 LIDs each. Similarly, servers 109 and 110 are a part of Virtual fabrics 305 and 306 and are assigned 2 LIDs each. However, servers A1 111, S1 112 and S2 113 are a part of Virtual fabric 306 and are assigned one LID each. Based on configuration C301, SM/SA 303 may assign routes as described below.

Switches 114 through 117 may be configured to route to servers 106-113 via switches 118-120, as follows:
Destination: Route:
C1 106 Route via switch 118 for Virtual Fabric 304
C2 107 Route via switch 118 for Virtual fabric 304
C3 108 Route via switch 118 for Virtual fabric 304
C4 109 Route via switch 119 for Virtual fabric 305
C5 110 Route via switch 119 for Virtual fabric 305
C1 106 Route via switch 120 for Virtual fabric 306
C2 107 Route via switch 120 for Virtual fabric 306
C3 108 Route via switch 120 for Virtual fabric 306
C4 109 Route via switch 120 for Virtual fabric 306
C5 110 Route via switch 120 for Virtual fabric 306
A1 111 Route via switch 120 for Virtual fabric 306
S1 112 Route via switch 120 for Virtual fabric 306
S2 113 Route via switch 120 for Virtual fabric 306

The exception to the foregoing routes may be for cases where a direct route is available without involving switches 118 through 120. For example switch 114 may route directly to C1 106 and C2 107 without using switches 118 through 120. Similarly, leaf switch 115 can route directly to C3 108 and C4 109; leaf switch 116 can route directly to C5 110 and A1 111; and leaf switch 117 can route directly to S1 112 and S2 113.

In the fabric 105 example, there is only one route from each switch 118-120 to a given server 106 through 113. Hence, switches 118 through 120 are configured as follows:

| Destination | Route |
|---|---|
| C1 106 | Route via leaf1 114 |
| C2 107 | Route via leaf1 114 |
| C3 108 | Route via leaf2 115 |
| C4 109 | Route via leaf2 115 |
| C5 110 | Route via leaf3 116 |
| A1 111 | Route via leaf3 116 |
| S1 112 | Route via leaf4 116 |
| S2 113 | Route via leaf4 116 |

SM/SA 303 uses the foregoing routings to configure routing tables in switches 114 through 120.

In step S504, SM/SA 303 assigns a partition to each switch. Using the configuration C301 example, SM/SA 303 may assign partitions as follows:
Leaf 1 114 Partitions: 0x0001, 0x0003
Leaf 2 115 Partitions: 0x0001, 0x0002, 0x0003
Leaf 3 116 Partitions: 0x0002, 0x0003
Leaf 4 117 Partitions: 0x0003
Core1 118 Partitions: 0x0001
Core2 119 Partitions: 0x0002
Core3 120 Partitions: 0x0003

These partitions are used in step S406 described above with respect to FIG. 4A. SM/SA 303 uses these partitions to configure the partition tables in switches 114 through 120.

In step S505, SM/SA 303 assigns a service level to each application. Using the configuration C301 example, SM/SA 303 may assign Service Levels as follows:
Service ID 1234→Service Level 1
Service ID 5678→Service Level 2
Service ID 1567→Service Level 3

In step 506, SM/SA computes QOS parameters for each server 106 through 113 and each switch 114 through 120. The QOS parameters for Virtual fabric configuration C301 may vary for servers 106-113 and switches 114-120. QOS parameters may be based on a requested bandwidth and priority for each application within each virtual fabric 304-306. In conventional systems, QOS is fixed for all the servers and switches and are based on Service Level only. The SL to VL mappings for individual servers may be set as follows:

Server C1 106, C2 107, C3 108, C4 109 and C5 110:
Service Level to VL Mapping
Service Level 1→VL 1
Service Level 2→VL 2
Service Level 3→VL 3
VL Arbitration Table
  High
    VL 2 Count 1
  Low
    VL 1 Count 3
    VL 3 Count 2
Server A1 111, S1 112 and S2 113:
Service Level to VL Mapping
Service Level 2→VL 1
Service Level 3→VL 2
VL Arbitration Table
  High
    VL 1 Count 1
  Low
    VL 2 Count 3

Service Level to VL Mapping for leaf switches 114 through 117 when communicating to core switch 118 or core switch 119 may be set as follows:
Service Level 1→VL 1
VL Arbitration Table
  Low
    VL 1 Count 1

Service Level to VL Mapping for leaf switches 114 through 117 when communicating to core switch 120 may be set as follows:
Service Level to VL Mapping
Service Level 2→VL 1
Service Level 3→VL 2
VL Arbitration Table
  High
    VL 1 Count 1
  Low
    VL 2 Count 3

These assignments are used in step S406 described above with respect to FIG. 4A. SM/SA 303 uses these partitions to configure the SL to VL and VL Arbitration tables in switches 114 through 120.

In one embodiment, the foregoing integrated process improves fabric configuration. A single enhanced user interface using integrated parameters is used to configure QOS, partitions and routing.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method comprising:
receiving one or more virtual fabric configuration parameters;
determining if a virtual fabric configuration of a virtual fabric within an Infiniband fabric based on the one or more virtual fabric configuration parameters can be implemented;
computing a quality of service (QOS) parameter, a routing and a partition such that the QOS parameter, routing and partitioning are interrelated, wherein computation of the QOS parameter is influenced by a bandwidth and a partition membership of each of a plurality of virtual fabrics;
configuring a plurality of switches and a plurality of host channel adapters (HCA's) within the virtual fabric based on the virtual fabric configuration; and
routing packets over the virtual fabric after the configuring.

2. The method of claim 1, wherein computing the QOS parameter, the routing and the partition comprises:
assigning a plurality of partition keys;
assigning a plurality of servers to a plurality of partitions;
computing the routing;
assigning a plurality of switches to the partitions;
assigning a plurality of service levels to a plurality of applications; and
computing the QOS parameter.

3. The method of claim 1, wherein the virtual fabric configuration is provided by an enhanced user interface.

4. The method of claim 1, wherein the subnet manager notifies a user if the configuration cannot be realized in the Infiniband fabric.

5. The method of claim 1, wherein the subnet manager configures the switches and HCAs via a subnet manager administrator (SMA).

6. The method of claim 1, wherein virtual fabrics requesting higher bandwidth are given more paths within the fabric.

7. The method of claim 1, wherein when computing the QOS parameter, the routing and the partition, the QOS parameter within links shared among a plurality of virtual fabrics is based on a bandwidth and a priority designated for each of the virtual fabrics.

8. The method of claim 1, wherein when computing the QOS parameter, the routing and the partition, a membership for a device in each partition is based on a membership of the device within a given one of a plurality of virtual fabrics.

9. A system comprising:
an enhanced subnet manager user interface coupled to an enhanced subnet manager executed by a computing device, wherein a user inputs a configuration request comprising one or more virtual fabric configuration parameters to configure a virtual fabric to the enhanced subnet manager, and the enhanced subnet manager validates if the configuration request is realizable, computes a quality of service (QOS) parameter, a routing and a partition such that the QOS parameter, routing and partitioning are interrelated, wherein computation of the QOS parameter is influenced by a bandwidth and a partition membership of each of a plurality of virtual fabrics, configures a plurality of switches and a plurality of host channel adapters (HCA's) within the virtual fabric based on the virtual fabric configuration.

10. The system of claim 9, wherein the enhanced subnet manager computes the QOS parameter, the routing and the partition by assigning a plurality of partition keys, assigning a plurality of servers to a plurality of partitions, computing the routing assigning a plurality of switches to the partitions assigning a plurality of service levels to a plurality of applications; and computing the QOS parameter.

11. The system of claim 9, wherein the subnet manager notifies a user if the requested configuration cannot be realized in the Infiniband fabric.

12. The system of claim 9, wherein the subnet manager configures the switches and HCA's via a subnet manager administrator (SMA).

13. The system of claim 9, wherein virtual fabrics requesting higher bandwidth are given more paths within the fabric.

14. The system of claim 9, wherein when computing the QOS parameter, the routing and the partition, the QOS parameter within links shared among a plurality of virtual fabrics is based on a bandwidth and a priority designated for each of the virtual fabrics.

15. The system of claim 9, wherein when computing the QOS parameter, the routing and the partition, a membership for a device in each partition is based on a membership of the device within a given one of a plurality of virtual fabrics.

16. A non-transitory computer readable medium having instructions, which when executed by a processor causes the processor to perform:
- receiving one or more virtual fabric configuration parameters;
- determining if a virtual fabric configuration of a virtual fabric within an Infiniband fabric based on the one or more virtual fabric configuration parameters can be implemented;
- computing a quality of service (QOS) parameter, a routing and a partition such that the QOS parameter, routing and partitioning are interrelated, wherein computation of the QOS parameter is influenced by a bandwidth and a partition membership of each of a plurality of virtual fabrics;
- configuring a plurality of switches and a plurality of host channel adapters (HCA's) within the virtual fabric based on the virtual fabric configuration; and
- routing packets over the virtual fabric after the configuring.

17. The non-transitory computer readable medium of claim 16, wherein computing the QOS parameter, the routing and the partition comprises:
- assigning a plurality of partition keys;
- assigning a plurality of servers to a plurality of partitions;
- computing the routing;
- assigning a plurality of switches to the partitions;
- assigning a plurality of service levels to a plurality of applications; and
- computing the QOS parameter.

18. The non-transitory computer readable medium of claim 16, wherein the virtual fabric configuration is provided by an enhanced user interface.

19. The non-transitory computer readable medium of claim 16, wherein the subnet manager notifies a user if the configuration cannot be realized in the IB fabric.

20. The non-transitory computer readable medium of claim 16, wherein the subnet manager configures the switches and HCAs via a subnet manager administrator (SMA).

21. The non-transitory computer readable medium of claim 16, wherein virtual fabrics requesting higher bandwidth are given more paths within the fabric.

22. The non-transitory computer readable medium of claim 16, wherein when computing the QOS parameter, the routing and the partition, the QOS parameter within links shared among a plurality of virtual fabrics is based on a bandwidth and a priority designated for each of the virtual fabrics.

23. The non-transitory computer readable medium of claim 16, wherein when computing the QOS parameter, the routing and the partition, a membership for a device in each partition is based on a membership of the device within a given one of a plurality of virtual fabrics.

* * * * *